Patented Feb. 25, 1947

2,416,549

UNITED STATES PATENT OFFICE 2,416,549

AZO PRINTING COMPOSITION

Francis H. Smith, Woodstown, N. J., and Chiles E. Sparks, Wilmington, Del., assignors to E. I. du Pont de Nemours & Company, Wilmington, Del., a corporation of Delaware No Drawing. Application July 20, 1943, Serial No. 495,502

5 Claims. (Cl. 260—181)

This invention relates to blue azo colors which find one field of great usefulness as stabilized printing compositions.

Very desirable blue pigments are formed on the fiber by stabilizing azotized dianisidine by reaction with a suitable compound, such as methyl glucamine, which remains stable in the presence of alkali, mixing the stabilized diazo with the arylides of beta-oxy-naphthoic acid in a printing paste which is applied to the fiber and developed by reaction with acid. Attempts to make greener shades of this color have failed because, as the shade has been shifted toward the green by the substitution of auxochromes or other devices, the fastness of the color has been materially impaired.

It is an object of this invention to prepare dyestuffs at least equal in physical and chemical properties to a combination of dianisidine with the arylamides of beta-hydroxy-naphthoic acid and which have greener shades.

The objects of the invention are accomplished, generally speaking, by a dyestuff which is formed by coupling azotized disanisidine to an intermediate containing the anilide of beta-oxy-naphthoic acid, and beta-oxy-naphthoic acid, in a ratio of acid to anilide of 1:19 to 1:2.0. With amounts of acid materially less than the 1:19 ratio there is not enough shade change toward the green. It is only when the proportion reaches roughly 1:19 that a material shift is observed. When the proportion of acid to anilide is materially greater than 1:2, the fastness of the resulting colors is adversely affected.

A still further greening of the shade of these colors can be produced by a reaction with alkali chromate. This alkali chromate can be added in small amounts to the printing pastes, or incorporated in the powder or solution to be used for printing.

The following examples illustrate but do not limit the invention:

Example I

A finely divided powder, obtained by milling 34.2 parts of the diazoimino compound prepared from dianisidine tetrazo and methyl glucamine, 34.3 parts of the anilide of beta-oxy-naphthoic acid and 3 parts of potassium chromate, is prepared by milling the material until 98% of it will pass through a 60-mesh screen. Four parts of dry caustic soda and 3 parts of beta-hydroxy-naphthoic acid are ground. The two ground materials are charged into a mixer and mixed until a homogeneous product is obtained.

Four parts of the above mixture, 3 parts of caustic soda (35% by weight), and 4 parts of ethyl alcohol are mixed. Nineteen parts of water are added, and the mixture stirred until well blended. 70 parts of starch tragacanth gum are added, and the resulting paste is stirred until homogeneous. The paste is printed on cotton, dried, acid aged, soaped, and dried. A green-blue print is obtained, which possesses good fastness properties.

This print has the same general fastness properties and is much greener in shade than one prepared from a printing composition containing the anilide of beta-hydroxy-naphthoic acid alone.

Example II

A solution is prepared from 73.6 parts of 100% diazoimino from dianisidine and methyl glucamine, 130 parts of Naphthanil AS (the anilide of beta-oxy-naphthoic acid) and 176 parts of alcohol, 133 parts of caustic soda (30% by weight), and sufficient water to total 1,000 parts. The solution is stirred with 4 parts of Nuchar and 5 parts of Super Cel and filtered. The filtrate is incorporated into a printing paste using starch tragacanth gum as a thickener. A blue shade is obtained upon printing on cotton, followed by drying, aging, soaping and drying. A portion of the above filtrate, if heated at moderate reflux for approximately 16 hours, if printed in the same manner, gives a much greener shade of blue. Under the refluxing conditions, Naphthanil AS is hydrolyzed to yield beta-oxy-naphthoic acid which produces a greener shade.

Example III

A solution containing 20 parts of the mixed intermediates prepared in Example I but lacking the chromate, 17.5 parts of ethyl alcohol, 13.5 parts of 30% caustic soda and 29 parts of water, was used in preparing a printing paste and was printed in the customary manner. The print obtained was considerably greener in shade (approximating that of Example II) than the corresponding mixture containing only the anilide as a coupling component.

By this invention there are produced pigments of greener shades than those produced by coupling the tetrazo of dianisidine with the anilide of beta-oxy-naphthoic acid, but which have equal fastness properties. This invention is quite limited in that all azoic blues prepared from dianisidine and an arylide of beta-hydroxy-naphthoic acid do not show this increased greenness of shade with the addition of beta-hydroxynaphthoic acid. In some cases an actual shift toward the red occurs with the addition of beta-hydroxy-naphthoic acid. For instance, if the ortho-anisidide of beta-hydroxy-naphthoic acid replaces Naphthanil AS, the addition of beta-hydroxy-naphthoic acid shifts the shade toward red.

As many apparently widely different embodiments of this invention may be made without departing from the spirit and scope thereof, it is to be understood that we do not limit ourselves to the specific embodiments thereof except as defined in the appended claims.

We claim:

1. Textile fiber dyed with a disazo compound which is developed on the fiber and is represented by the formula $$R-N=N-D-N=N-R$$

wherein D is the radical of dianisidine and the R's are the mixed radicals resulting from a mixed intermediate which consists of beta-hydroxy naphthoic acid and the anilide thereof, the ratio of beta-hydroxy naphthoic acid to the anilide thereof being in the range of about 1 to 19 and 1 to 2.0.

2. Textile fiber dyed with a disazo compound in accordance with claim 1 chromed with an alkali chromate.

3. A printing composition comprising a diazoimino of dianisidine and a mixed coupling component containing the anilide of beta-oxy-naphthoic acid and beta-oxy-napththoic acid having a ratio of acid to anilide in the range of about 1:19 and 1:2.0.

4. The diazo printing composition of claim 3 containing an alkali chromate.

5. The process which comprises coupling tetrazotized dianisidine with the anilide of beta-oxy-naphthoic acid and partially hydrolyzing the disazo compound until the ratio of the radical of the resulting beta-hydroxy naphthoic acid in the product to the radical of the anilide of beta-hydroxy naphthoic acid therein is in the range of about 1:19 and 1:2.0.

FRANCIS H. SMITH.
CHILES E. SPARKS.

REFERENCES CITED

The following references are of record in the file of this patent:

UNITED STATES PATENTS

| Number | Name | Date |
|---|---|---|
| 1,532,921 | Munz | Apr. 7, 1935 |
| 1,042,356 | Laska et al. | Oct. 22, 1912 |
| 2,255,130 | Seymour et al. | Sept. 9, 1941 |